(12) United States Patent
Inoguchi et al.

(10) Patent No.: US 7,522,342 B2
(45) Date of Patent: Apr. 21, 2009

(54) IMAGE DISPLAY APPARATUS

(75) Inventors: Kazutaka Inoguchi, Kawasaki (JP);
Motomi Matsunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 11/675,366

(22) Filed: Feb. 15, 2007

(65) Prior Publication Data

US 2007/0206289 A1 Sep. 6, 2007

(30) Foreign Application Priority Data

Mar. 1, 2006 (JP) .............................. 2006-054722

(51) Int. Cl.
*G02B 27/14* (2006.01)
*G09G 5/00* (2006.01)

(52) U.S. Cl. ............................ 359/630; 359/631; 345/8

(58) Field of Classification Search ......... 359/629–634; 345/7–9

See application file for complete search history.

(56) References Cited

U.S. PATENT DOCUMENTS 6,836,347 B2 * 12/2004 Amanai et al. .............. 359/630
7,019,909 B2 3/2006 Yamazaki et al.
2002/0097197 A1 * 7/2002 Togino et al. ................... 345/8

FOREIGN PATENT DOCUMENTS

JP 2004-341324 12/2004

* cited by examiner

*Primary Examiner*—Alicia M Harrington
(74) *Attorney, Agent, or Firm*—Locke Lord Bissell & Liddell LLP

(57) ABSTRACT

An image display apparatus having a wide view angle of an observed image with a small (thin) structure, which includes: two image forming elements; and an optical system guiding a beam from the image forming elements to two observation areas, wherein the system includes curved reflecting surfaces, and is symmetrical about a symmetry plane intermediate between the observation areas, in which a beam from the image forming element on a side of the symmetry plane is reflected on a curved reflecting surface on the side, reflected on a curved reflecting surface on the other side, is reflected on the surface on the side, and transmits a surface SLa to be guided to the observation area on the side; and an area, in the surface Sla, which a beam LLa traveling along an optical path closest to the symmetry plane transmits, has a shape having positive refractive power.

10 Claims, 5 Drawing Sheets

IMAGE DISPLAY APPARATUS

BACKGROUND OF THE INVENTION

1. Field of the Invention

The present invention relates to an image display apparatus for displaying an image, which is formed on an image forming element such as a liquid crystal display element, to an observer via an optical system, and more particularly, to an image display apparatus suitable for a head-mount display (HMD).

2. Description of the Related Art

An image display apparatus such as a head-mount display (HMD) is desired to have presence enhanced by widening a view angle of an observed image, and to be miniaturized and lightened in general in order to be mounted on a head of a user. In particular, when a weight balance and an appearance of the entire apparatus are taken into account, it is desirable that the image display apparatus have a small thickness in a visual axis direction (front direction) of an observer.

In order to widen the view angle using a small liquid crystal panel, it is preferable to form an intermediate real image of an image displayed on the liquid crystal panel serving as an optical system for observation to observe a virtual image of the intermediate real image as an enlarged image. U.S. Pat. No. 7,019,909 proposes an HMD in which a decentering reflecting surface, in which light passes through a turn back reflecting surface and a periphery thereof, is used as an intermediate imaging optical system, a back-and-forth optical path is formed, and intermediate imaging is performed in the optical path, to thereby widen a view angle.

Further, the HMD preferably has a favorable appearance when the HMD is mounted on a head of an observer. In particular, when the observer wearing the HMD is viewed from the front, it is preferable that the entire apparatus be elongate in a horizontal direction in a case where the same projected area is used. For example, with respect to an observer 81 shown in FIG. 8A, it is more preferable to use an apparatus 83 which has a shorter vertical width and a longer horizontal width as illustrated in FIG. 8C than to use an apparatus 82 which has a longer vertical width and a shorter horizontal width as illustrated in FIG. 8B. Thus, in order to obtain the apparatus having a longer horizontal width, it is preferable to use a lateral optical system in which each eccentric direction of a plurality of decentering reflecting surfaces is not developed in a vertical direction of a face of an observer, but is developed in a horizontal direction of the face.

Japanese Patent Application Laid-Open No. 2004-341324 proposes an HMD in which a reflecting surface is arranged between an optical device for forming a reciprocating optical path formed by a turn back reflecting surface, and an image forming element, to thereby reduce the size of the entire apparatus. In Japanese Patent Application Laid-Open No. 2004-341324, the entire apparatus is reduced in size by adopting an optical system in which optical paths for light beams made incident on left and right eyes intersect with each other between the image forming element and the reflecting surface and between the reflecting surface and the optical device.

The optical system in which intermediate image is formed in the optical path to widen the view angle requires a large number of components and a long optical path length, so the size of the entire apparatus tends to become larger.

In addition, when the apparatus is structured to have a short vertical width and a longer horizontal width in order to obtain a favorable appearance of the apparatus in a case where the HMD is mounted on the head of a user, the thickness of the apparatus in the visual axis direction of the observer tends to be increased.

SUMMARY OF THE INVENTION

It is an object of the present invention to provide an image display apparatus capable of easily widening a view angle of an observed image with a small (thin) structure in general.

According to an example of the present invention, an image display apparatus includes: a pair of image forming elements; and an optical system for guiding a light beam from the pair of image forming elements to a pair of observation areas, in which: the optical system includes a plurality of curved reflecting surfaces and is symmetrical with respect to a symmetry plane which is a plane passing through a center of the pair of observation areas, in which a light beam from an image forming element disposed on one side of the symmetry plane is reflected on a curved reflecting surface disposed on the one side and on a curved reflecting surface disposed on the other side of the symmetry plane to return to the one side, and the light beam is reflected on the curved reflecting surface disposed on the one side of the symmetry plane, and passes through a surface SLa to be guided to the observation area on the one side. And an area in the surface SLa through which a light beam LLa, which travels along an optical path closest to the symmetry plane, passes, among effective light beams which pass through the surface SLa and reach the observation areas, is formed in a shape which has a positive refractive power.

According to another example of the present invention, an image display apparatus includes: a pair of image forming elements; and an optical system for guiding a light beam from the pair of image forming elements to a pair of observation areas, in which: the optical system includes a plurality of curved reflecting surfaces and is symmetrical with respect to a symmetry plane which is a plane passing through a center of the pair of observation areas, in which a light beam from an image forming element disposed on one side of the symmetry plane, is reflected on a curved reflecting surface disposed on the one side and on a curved reflecting surface disposed on the other side of the symmetry plane to return to the one side, and the light beam is reflected on the curved reflecting surface disposed on the one side of the symmetry plane to be guided to the observation area on the one side; and a light beam, among effective light beams reaching the observation areas, which travels along an optical path closest to the symmetry plane after passing through the optical system is subjected to a positive refractive power.

According to the present invention, an image display apparatus is provided which is capable of easily widening a view angle of an observer while reducing the size of the apparatus to be small (thin) in general.

Further features of the present invention will become apparent from the following description of exemplary embodiments with reference to the attached drawings.

DESCRIPTION OF THE EMBODIMENTS

Embodiment 1

Figure 1:
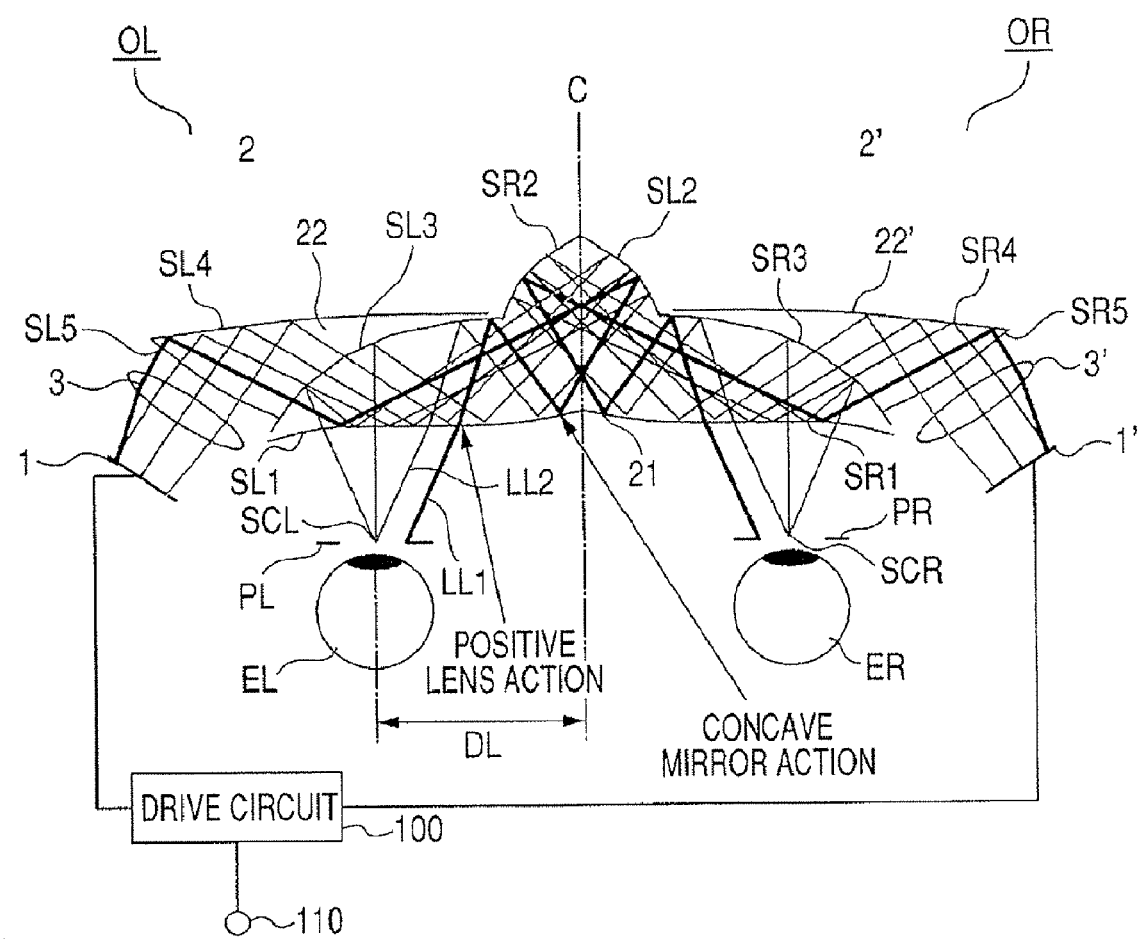
FIG. 1 is a schematic diagram illustrating a main part according to a first embodiment of the present invention.

FIG. 1 illustrates a structure of the present invention in a case where the present invention is applied to a head-mount display (HMD) and schematically illustrates the HMD viewed from the top.

A prism (optical device) 21 is shared by an optical system for left and right eyes. In the prism 21, surfaces SL1 (SLa), SL2, SL3, SR1 (SLa), SR 2, and SR3 are formed on a medium having a refractive index larger than 1.

A prism 22 is cemented onto the surface SL3. In the prism 22, in addition to the surface SL3 shared with the prism 21, surfaces SL4 and SL5 are formed on a medium having a refractive index larger than 1.

A prism 22' is cemented onto the surface SR3. In the prism 22', in addition to the surface SR3 shared with the prism 21, surfaces SR4 and SR5 are formed on a medium having a refractive index larger than 1.

An image forming element 1 for a left eye EL is constituted by a liquid crystal display (LCD).

A prism part 2 which includes a curved decentering reflecting surface group of an optical system for the left eye EL includes the surfaces SL1 and SL3 that are reflecting surfaces of a part of the curved decentering reflecting surface group and are transparent surfaces, the surfaces SL2 and SL4 that are reflecting surfaces, and the surface SL5 which is a transparent surface.

A lens 3 condenses the light beam from the LCD 1. The prism part 2 including the curved decentering reflecting surface group and the lens 3 form a left eye optical system OL according to the first embodiment.

An image forming element 1' for a right eye ER is formed of a LCD.

A prism part 2' including a curved decentering reflecting surface group of an optical system for the right eye ER includes the surfaces SR1 and SR3 that are reflecting surfaces of a part of the curved decentering reflecting surface group and are transparent surfaces, the surfaces SR2 and SR4 that are reflecting surfaces, and the surface SR5 which is a transparent surface.

A lens 3' condenses the light beam from an LCD 1'. The prism part 2' including the curved decentering reflecting surface group and the lens 3' form a right eye optical system OR according to the first embodiment.

Reference symbols SCL and SCR respectively denote center positions of exit pupils PL and PR formed by the left eye optical system OL and the right eye optical system OR.

A plane C passes through the center of a line connecting the center position SCL of the exit pupil of the left eye optical system OL and the center position SCR of the exit pupil of the right eye optical system OR, and is perpendicular to the line. In this embodiment, the left eye optical system OL and the right eye optical system OR are of mirror symmetry with respect to the plane C. And the image display surfaces, that is, the LCDs 1 and 1', are of mirror symmetry with respect to the plane C.

The HMD according to the first embodiment includes a drive circuit 100 for driving the LCDs 1 and 1'. The drive circuit 100 is connected with image information supply apparatuses (not illustrated) such as a personal computer, a DVD player, and a television tuner at a junction 110. The drive circuit 100 causes the LCDs 1 and 1' to display an original according to input image information, which is also performed in the following embodiments.

The optical path according to the first embodiment of the left eye optical system OL is first described. A light beam emitted from the LCD 1 provided on the left eye side of the plane C is condensed by the lens 3 and guided to the transparent surface SL5 of the prism 22. The light beam made incident on the prism 22 from the transparent surface SL5 is made incident on an area surrounded by a curved decentering reflecting surface group formed of four surfaces, that is, the surfaces SL1, SL2, SL3, and SL4. The light beam guided to the area is reflected on the surface SL4 provided on the left eye side of the plane C, and is made incident on the prism 21 from the cemented surface SL3 which is a half mirror.

The light beam made incident on the prism 21 is made incident on the surface (first reflecting surface) SL1 provided on the left eye side of the plane C with an incident angle equal to or more than arcsin (1/n) which is a critical angle where n represents a refractive index of the medium of the prism 21. As a result, the light beam is subjected to total internal reflection on the surface SL1 and travels toward the surface (second reflecting surface) SL2 provided on the right eye ER side of the plane C. The light beam reflected on the surface SL2 and returned to the left eye side of the plane C is subjected to total internal reflection again by being made incident on the surface SL1 with an incident angle equal to or more than arcsin (1/n), and travels toward a surface (third reflecting surface) SL3. The light beam reflected on the half mirror surface SL3 is made incident on the surface SL1 with an incident angle smaller than arcsin (1/n) and is exits from the prism 21. After that, the light beam is guided to the left eye EL of the observer.

A plurality of principal rays emitted from different portions on the LCD 1 are collected on the center position SCL of the exit pupil, and the light beams emitted from the LCD 1 forms the exit pupil PL of the left eye optical system OL with the center position SCL of the exit pupil being as a center. Thus, the left eye EL of the observer placed on the position of the exit pupil PL or the observation area which is in the vicinity of the position of the exit pupil PL, observes an enlarged image of the original displayed on the LCD 1 for the left eye.

On the other hand, in the right eye optical system OR, the light beam from the LCD 1' provided on the right eye side of the plane C is condensed by the lens 3' and guided to the transparent surface SR5 of the prism 22'. The light beam made incident on the prism 22' from the transparent surface SR5 is made incident on the area surrounded by a curved decentering reflecting surface group formed of four surfaces, that is, the surfaces SR1, SR2, SR3, and SR4. The light beam guided to the area is reflected on the surface SR4 provided on the right eye side of the plane C and is made incident on the prism 21 from the cemented surface SR3 which is a half mirror.

The light beam made incident on the prism 21 is made incident on the surface (first reflecting surface) SR1 provided on the right eye side of the plane C with an incident angle equal to or more than arcsin (1/n) which is a critical angle where n represents the refractive index of the medium of the prism 21. As a result, the light beam is subjected to total internal reflection on the surface SR1, and travels toward the surface (second reflecting surface) SR2 provided on the left eye side of the plane C. The light beam reflected on the surface SR2 and returned to the right eye side of the plane C is subjected to total internal reflection again by being made incident on the surface SR1 with an incident angle equal to or more than arcsin (1/n), and travels toward a surface (third reflecting surface) SR3. The light beam reflected on the half mirror surface SR3 is made incident on the surface SR1 with an incident angle smaller than arcsin (1/n) and exits from the prism 21. After that, the light beam is guided to the right eye ER of the observer. As a result, the right eye ER of the observer observes the enlarged image of the original displayed on the LCD 1' for the right eye.

Thus, the left eye optical system OL and the right eye optical system OR are symmetrical with respect to the plane C, and the optical path for the left eye and the optical path for the right eye are also symmetrical with respect to the plane C. For this reason, a structure of the left optical system OL is mainly described in detail below.

In the optical system according to the first embodiment, the surfaces SR2 and SL3 are disposed on a side opposite to the surface SL1. A distance DL between the center position SCL of the exit pupil and the symmetry plane C is approximately a half of a interpupillary distance of an observer, and a width of the optical system in the horizontal direction is restricted. Thus, whether the view angle of the optical system can be widened or not depends on how effective diameters of the surfaces SR2 and SL3 are reduced. A light beam LL1 (LLa) is a light beam for determining an effective diameter of the surface SL3 on the symmetry plane C side. The light beam LL1 closest to the symmetry plane C among the effective light beams forming the exit pupil PL which is an observation area is a marginal light beam passing through a right-most side (inner side) of the exit pupil PL with a view angle being the right-most side (inner side) with respect to the symmetry plane C. The light beam LL1 is subjected to a positive transmission refractive power, thereby reducing a size of the effective diameter of the curved reflecting surface SL3. Specifically, when the light beam LL1 reflected on the surface SL3 and is closest to the symmetry plane C is transmitted through the surface SL1 and reaches the exit pupil PL, the light beam LL1 is subjected to the positive refractive power, that is, an action (positive lens action) with which the light beam curves to a side of a center view angle principal ray.

Further, when the light beam is reflected on the surface SL1 during the light beam from the surface S2 reaches the surface SL3 through the surface SL1, the light beam LL1 closest to the symmetry plane C is subjected to positive power (concave mirror action). Thus, the effective diameter of the surface SL2 is reduced.

Next, a description is made of a path (optical path) of light beam reversely tracing from the exit pupil PL to the LCD 1. In the reverse tracing of the light beam, the light beam LL1 which is reflected on the surfaces SL3 and SL1 to travel toward the surface SL2 and is closest to the symmetry plane C is subjected to concave mirror action by the surface SL1. As a result, the light beam LL1 and a principal ray LL2 having the same view angle as that of the light beam LL1 intersect with each other before reaching the surface SL2, to thereby reduce the effective diameter of the surface SL2 on the side where the surface SL2 intersects with the surface SR3. Thus, the optical system according to the first embodiment achieves reduction in size and widening of the view angle.

Figure 2:
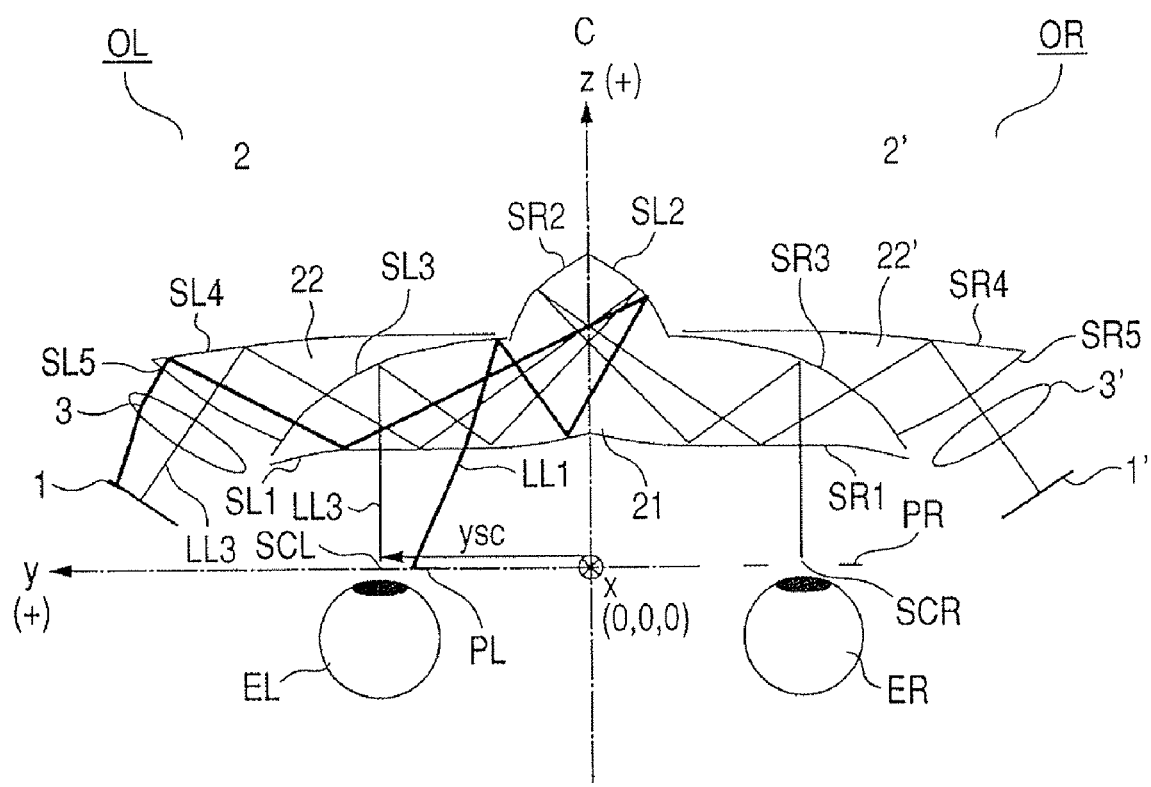
FIG. 2 is an explanatory diagram of a coordinate system according to the first embodiment of the present invention.
Figure 3:
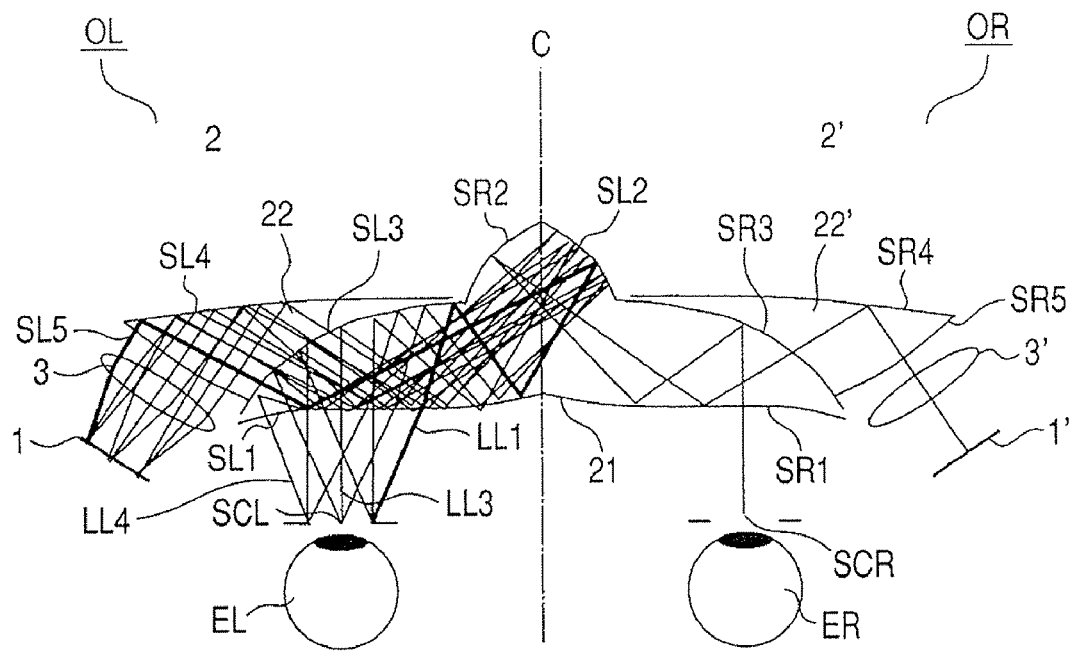
FIG. 3 is an explanatory diagram of an optical path according to the first embodiment of the present invention.

FIG. 2 is an explanatory diagram of a coordinate system illustrated in FIG. 1. FIG. 3 illustrates a center view angle principal ray LL3 which is a light beam that is emitted from the center of the display surface of the LCD 1 and reaches the center position SCL of the exit pupil, the light beam LL1 which is closest to the symmetry plane C which is a target light beam in the left eye optical system OL, and a light beam LL4 which is farthest from.

In FIG. 2, a straight line formed by intersecting a paper surface of the figure and the plane C is defined as a Z axis. On the Z axis, a positive direction is defined as a direction opposite to a direction in which the center view angle principal ray LL3 is made incident on the left eye EL and right eye ER. In addition, a Y axis is defined as a straight line connecting the center position SCL of the left exit pupil PL and the center position SCR of the right exit pupil PR of the optical system. On the Y axis, a positive direction is defined as a direction from the exit pupil PR on the right eye side to the exit pupil PL on the left eye side. Further, an x axis is defined as a straight line perpendicular to the Y axis and the Z axis. On the x axis, a positive direction is defined as a depth direction of the paper surface so as to form a right-handed coordinate system. An origin (0, 0, 0) is defined as an intersection of the Y axis with the plane C.

With reference to FIGS. 2 and 3, an optical path in the Z-axis direction will be described. The light beam that emitted from the LCD 1 and travels in the positive direction of the Z axis transmits through the surface SL5, is reflected on the surface SL4, and travels in the negative direction of the Z axis. The light beam traveling in the negative direction of the Z axis transmits through the surface SL3 and travels in the negative direction of the Z axis. Then the light beam is reflected on the surface SL1 and travels in the positive direction of the Z axis, thereby being guided to the surface SL2. On the surface SL2, the light beam reversely travels in the negative direction of the Z axis, and travels toward the surface SL1 again. The light beam is reflected on the surface SL1, thereby traveling in the positive direction of the Z axis again. Then, the light beam is reflected on the surface SL3 and travels in the negative direction of the Z axis, thereby being guided to the left eye EL. Thus, the optical path is folded in a zig-zag manner, thereby making the optical system thinner in the Z-axis direction.

Next, the optical path in the Y-axis direction will be described. The light beam which is emitted from the LCD1 which is disposed on the left eye side of the plane C, that is, in the positive area of the Y axis and travels in the negative direction of the Y axis travels in the negative direction of the Y axis during the reflection on the surface SL4, transmission through the surface SL3, and the reflection on the surface SL1. Then, the light beam is guided to the surface SL2 disposed in the right eye side of the plane C, that is, in the negative area of the Y axis. After that, the light beam is reflected on the surface SL2, to thereby change the direction thereof in the positive direction of the Y axis, and returns to the positive area of the Y axis which corresponds to the left side of the plane C. The light beam traveling in the positive direction of the Y axis is reflected on the surface SL1 disposed in the positive area of the Y axis while maintaining the traveling direction in the positive direction of the Y axis, and is reflected on the surface SL3 so that y component in the travelling direction becomes 0, thereby being guided to the left eye EL of the positive area of the Y axis.

In the first embodiment, the LCD 1 is disposed in the positive side in the Y axis direction of a center position (0, ysc, 0) SCL of the exit pupil of the left eye optical system OL. In other words, a distance between the plane C and the LCD 1 is longer than a distance between the plane C and the center position SCL of the exit pupil. The surface SL2 which reflects the light beam traveling in the negative Y-axis direction toward the positive Y-axis direction, is disposed in the negative side of the Y axis direction of the plane C. As a result, it is possible to secure an extremely longer optical path length as compared with the conventional optical system. In addition, with the structure, it is possible to reduce the power of the optical surface necessary for exhibiting the original displayed on the LCD 1 as an enlarged virtual image to the left eye EL, thereby making it possible to enhance the optical performance.

In particular, in a structure in which the optical path is developed in a direction connecting the left and right eyes, it is difficult to configure having the optical path length longer than a interpupillary distance, that is, 2×ysc. In the first embodiment, as described above, the optical path length longer than the interpupillary distance, 2×ysc, is secured in the optical system provided in front of the face of the observer, thereby enhancing the optical performance more easily.

Further, the surface SL2 on which the light beam traveling in the negative Y-axis direction is reflected in the positive Y-axis direction is disposed at a position in the negative area of the Y axis at which the optical path is folded in a zig-zag manner in the z direction. As a result, while having a long optical path length, the optical system has a structure having a thinner in the visual axis direction (Z axis direction) and a smaller size. Thus, even when the optical system is small in size, it is possible to obtain an extremely long optical path length.

In the optical system, it is easy to form an intermediate image of the original displayed on the LCD 1 in the optical path. Thus, in forming the intermediate image, it is possible to appropriately determine a relationship between the power of each surface forming the optical system and the arrangement of the optical path, thereby increasing the degree of freedom of the arrangement of the optical surfaces. As a result, the observer can more easily widen the view angle of an image to be observed by the observer with respect to size of the original, thereby making it possible to observe a projected image with a high sense of presence.

Note that, when the powers are excessively large, the effective diameter of the surface SL2 (SR2) is increased. As a result, in a reverse ray tracing, it is preferable to configure power arrangement so that the intermediate image is formed in the optical path from the surface SL1 to the surface SL2. Also the principal rays of each view angle are preferably reflected on the surface SL1 in the reverse ray tracing, and travel toward the surface SL2 while the distance therebetween is maintained or made narrower.

In the first embodiment, the light beam LL1 closest to the symmetry plane C is subjected to the positive refractive power through both the transmission through the surface SL1 and the reflection on the surface SL1. In contrast, the light beam LL4 farthest from the symmetry plane C among the effective light beams as illustrated in FIG. 3, preferably is subjected to a positive refractive power smaller than a positive refractive power to which the light beam LL1 closest to the symmetry plane C is subjected, more preferably, is subjected to a negative refractive power through the transmission or reflection on the surface SL1.

Next, in the reverse ray tracing from the pupils PL and PR, an optical path length from the surface SL3, which has the power strongest among the surfaces before reaching the intermediate image, to the surface SL2 through a reflection on the surface SL1 is described. The optical path length from the surface SL3 to the surface SL2 in the reverse ray tracing of the light beam LL4 farthest from the symmetry plane C is longer than the optical path length from the surface SL3 to the surface SL2 in the reverse ray tracing of the light beam LL1 closest to the symmetry plane C. In view of this, when the power is arranged so that the light beam LL1 with the view angle closest to the symmetry plane C is intermediately imaged in the halfway from the reflection on the surface SL1 to the surface SL2 in the reverse ray tracing, the light beam LL4 farthest from the symmetry plane C is imaged at a position close to the surface SL1. As a result, when the light beam reaches the surface SL2, the light beam is excessively widened, thereby increasing the effective diameter of the surface SL2.

Thus, in the first embodiment, the light beam LL4 farthest from the symmetry plane C among the effective light beams is subjected to a positive refractive power weaker than a positive refractive power to which the light beam LL1 closest to the symmetry plane C is subjected or is subjected to a negative power through the transmission through the surface SL1 and the reflection on the surface SL1. As a result, the size of the effective diameter of the surface SL2 is reduced.

Second Embodiment

Figure 4:
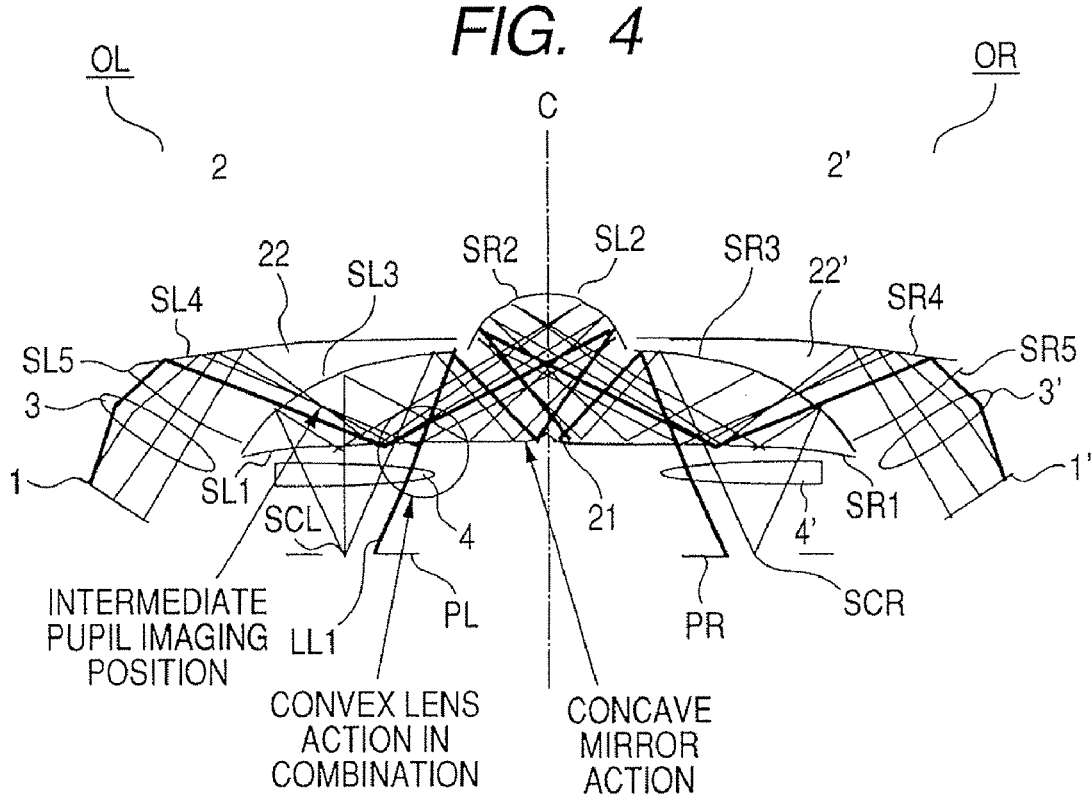
FIG. 4 is a schematic diagram illustrating a main part according to a second embodiment of the present invention.

FIG. 4 illustrates a structure of the present invention in a case where the present invention is applied to a head-mount display (HMD) and schematically illustrates the HMD viewed from the top.

A second embodiment is mainly different from the first embodiment in that a lens (optical element) 4 having a positive refractive power which forms a part of the left eye optical system OL is disposed between the prism 21 and the left exit pupil PL, and a lens (optical element) 4' having the positive refractive power which forms a part of the right optical system OR is disposed between the prism 21 and the right exit pupil PR. Other structures are similar to those of the first embodiment. Components identical with those according to the first embodiment are denoted by the same reference symbols and explanations thereof are omitted.

The optical paths according to the second embodiment are also symmetrical with respect to the plane C, so a description is made of only the left eye optical system OL. A light beam that is emitted from the LCD 1 disposed on the left eye EL (not illustrated) side of the plane C is condensed by the lens 3, and is guided to the transparent surface SL5 of the prism 22. The light beam incident on the prism 22 from the transparent surface SL5 is made incident on the area surrounded by the curved decentering reflecting surface group formed of four surfaces, that is, the surfaces SL1 (SLa), SL2, SL3, and SL4. The light beam guided to the area is reflected on the surface SL4 disposed on the left eye EL side of the plane C and is made incident on the prism 21 from the cemented surface SL3 which is a half mirror.

The light beam made incident on the prism 21 is made incident on the surface (first reflecting surface) SL1 disposed on the left eye EL side of the plane C with an incident angle of equal to or more than arcsin (1/n) which is a critical angle where n represents the refractive index of the medium of the prism 21. As a result, the light beam is subjected to total internal reflection on the surface SL1, and travels toward the surface (second reflecting surface) SL2 disposed on the right eye ER side of the plane C. The light beam reflected on the surface SL2 and returned toward the left eye EL side of the plane C is subjected to total internal reflection again by being made incident on the surface SL1 with an incident angle of equal to or more than arcsin (1/n) to travel toward a surface (third reflecting surface) SL3. The light beam reflected on the half mirror surface SL3 is made incident on the surface SL1 with an incident angle smaller than arcsin (1/n) and exits from the prism 21, and is then guided to the left eye EL of the observer via the lens 4.

A plurality of principal rays that are emitted from different portions on the LCD 1 are collected on the center position SCL of the exit pupil, and the light beams that exit the LCD 1 form the exit pupil PL of the left eye optical system OL with the center position SCL of the exit pupil being as a center. Thus, the left eye EL of the observer placed on the position of the exit pupil PL or the observation area which is in the vicinity of the position observes an enlarged image of the original image displayed on the LCD 1 for the left eye.

Also in the optical system according to the second embodiment, when an effective diameter of each of the surface SR2 and the surface SL3 is reduced, it is possible to widen the view angle of the optical system. Specifically, the light beam LL1 (LLa) is a light beam for determining an effective diameter on the surface SL3 on the symmetry plane C side. The light beam LL1 closest to the symmetry plane C among the effective light beams for forming the exit pupil PL which is an observation area is configured to be subjected to the positive transmission refractive power by only the lens 4 or by combination of the transmission through the surface SL1 and the transmission through the lens 4, thereby making it possible to reduce the effective diameter of the curved reflecting surface SL3.

Also, in the optical system according to the second embodiment, through the reflection on the surface SL1 when the light beam reaches the surface SL3 from the surface SL2 through the surface SL1, the light beam LL1 closest to the symmetry plane C is subjected to the positive power. As a result, the effective diameter of the surface SL2 is reduced.

Note that, when the combined power of the transmission through the surface SL1 and the transmission through the lens 4, and the power of the reflection on the surface SL1 are too strong, the effective diameter of the surface SL2 (SR2) is increased. As a result, in the reverse ray tracing, it is preferable to configure the power arrangement so that the intermediate image is formed in the half way from the reflection on the surface SL1 to the surface SL2. Also, the principal rays of each view angle are preferably reflected on the surface SL1 in the reverse ray tracing, and travel toward the surface SL2 while the distance therebetween is maintained or made narrower.

In the optical system according to the second embodiment, the effective diameter of each of the surface SL2 and the surface SL3 is reduced, to thereby achieve reduction in size and widening of the view angle.

Third Embodiment

Figure 5:
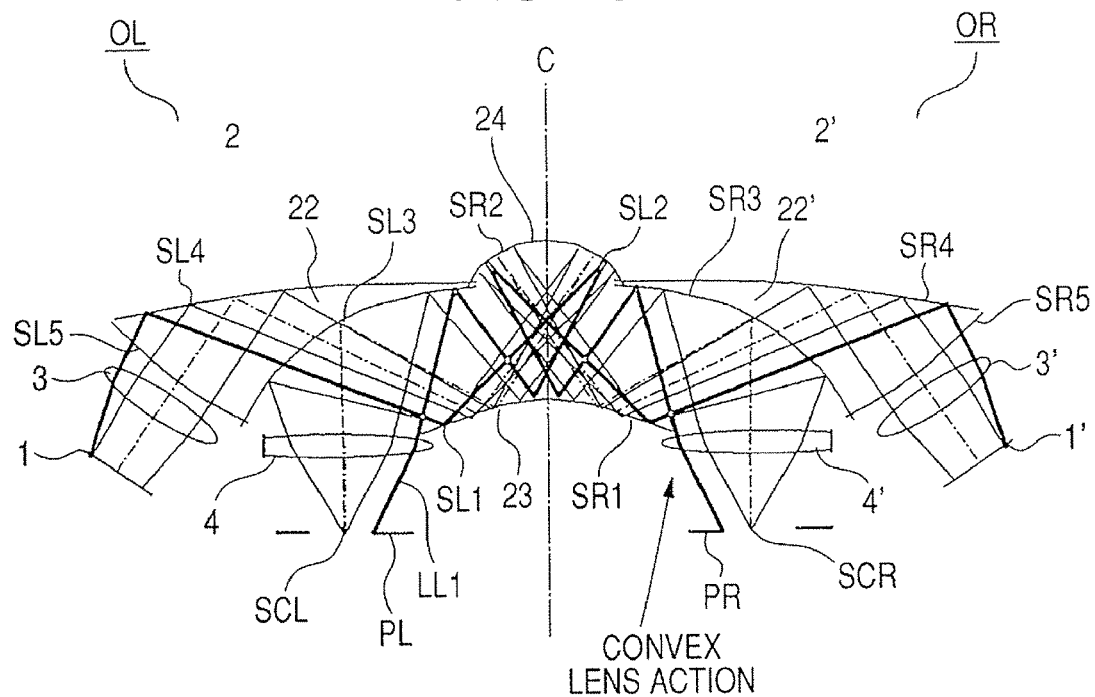
FIG. 5 is a schematic diagram illustrating a main part according to a third embodiment of the present invention.

FIG. 5 illustrates a structure of the present invention in a case where the present invention is applied to a head-mount display (HMD) and schematically illustrates the HMD viewed from the top.

A third embodiment is mainly different from the second embodiment in that hollow mirrors 23 and 24 formed of a plurality of reflecting surfaces are used instead of the prism 21. Other structures are similar to those of the second embodiment. Components identical with those according to the second embodiment are denoted by the same reference symbols and explanations thereof are omitted.

Optical paths according to the third embodiment are also symmetrical with respect to the plane C, so a description is made of only the left eye optical system OL. A light beam emitted from the LCD 1 disposed on the left eye EL (not illustrated) side of the plane C is condensed by the lens 3, and is guided to the transparent surface SL5 of the prism 22. The light beam made incident on the prism 22 from the transparent surface SL5 is made incident on a area surrounded by a curved decentering reflecting surface group formed of four surfaces, that is, the surfaces SL1 (SLa), SL2, SL3, and SL4. The light beam guided to the area is reflected on the surface SL4 disposed on the left eye EL side of the plane C and exits the prism 22 from the surface SL3 which is a half mirror.

The light beam that exits the prism 22 is reflected on the surface (first reflecting surface) SL1 disposed on the left eye EL side of the plane C, and travels toward the surface (second reflecting surface) SL2 disposed on the right eye ER side of the plane C. The light beam reflected on the surface SL2 and returned to the left eye EL side of the plane C is reflected again on the surface SL1, and travels toward the surface (third reflecting surface) SL3 of the prism 22. The light beam reflected on the half mirror surface SL3 is guided to the left eye EL of the observer via the lens 4.

A plurality of principal rays emitted from different portions on the LCD 1 form the exit pupil PL of the left eye optical system OL with the center position SCL of the exit pupil being as a center. Thus, the left eye EL of the observer placed on the position of the exit pupil PL or the observation area which is in the vicinity of the position observes an enlarged image of the original displayed on the LCD 1 for the left eye.

Also in the optical system according to the third embodiment, when an effective diameter of each of the surfaces SR2 and SL3 is reduced, it is possible to widen the view angle of the optical system. Specifically, the light beam LL1 (LLa) is a light beam for determining an effective diameter on the surface SL3 on the symmetry plane C side. By configuring that the light beam LL1 closest to the symmetry plane C among the effective light beams forming the exit pupil PL which is an observation area is subjected to the positive transmission refractive power at the time of transmission through the lens 4, the effective diameter of the curved reflecting surface SL3 can be reduced.

Also, in the optical system according to the third embodiment, the light beam LL1 closest to the symmetry plane C may be subjected to the positive power when reflected on the surface SL1 in the course of traveling from the surface SL2 to the surface SL3 through the surface SL1.

Note that, when the positive power of the lens 4 and the positive power of the reflection on the surface SL1 are too strong, the effective diameter of the surface SL2 (SR2) is increased. As a result, in the reverse ray tracing, it is preferable to configure the power arrangement so that the intermediate image is formed in the half way of traveling of the light beam to the surface SL2 after being reflected on the surface SL1. Also in the reverse ray tracing, the principal rays of each view angle are preferably reflected on the surface SL1, and travel to the surface SL2 while the distance therebetween is maintained or made narrower.

In the optical system according to the third embodiment, the effective diameter of each of the surface SL2 and the surface SL3 is reduced, to thereby achieve reduction in size and widening of the view angle.

According to the embodiments, a plurality of decentering reflecting surfaces are disposed in the optical system to guide the light beam emitted from the image display unit 1 disposed on the left eye EL side to the reflecting surface SL2 disposed on the right eye ER side, and to further guide the light beam to the left eye EL of the observer by the reflecting surfaces SL1, SL3, and SL4 disposed on the left eye EL side. Then, the light beam emitted from the image display unit 1' disposed on the right eye ER side is guided to the reflecting surface SR2 disposed on the left eye EL side, and is further guided to the right eye ER of the observer by the reflecting surfaces SR1, SR3, and SR4 disposed on the right eye ER side. For this reason, it is easy to suppress the size of the optical system to be small for the optical path length. In the embodiments, when the light beam reaches the observation areas PL and PR after being reflected on the final reflecting surfaces SL3 and SR3 of the plurality of curved decentering reflecting surface group, the light beam LL1 closest to the symmetry plane C among the effective light beams is subjected to the transmission refractive power. As a result, it is easy to display an image with a wide view angle.

In addition, the optical path folded in the visual axis direction by the plurality of curved decentering reflecting group is formed, thereby making it easier to reduce the thickness of the optical system.

In particular, in the embodiments, the optical system is employed to realize a thin image display apparatus while securing the long optical path length necessary for widening the view angle.

In this case, in the optical path in which the light beam that have been reflected on the plurality of curved reflecting surfaces and reaches the observation area, a surface or an optical element, by which the light beam LL1 (marginal light beam passing through the inner side of the observation area with a view angle of the inner-most side with respect to the symmetry plane) closest to the symmetry plane C among the effective light beams, is subjected to the positive transmission refractive power. Thus, it is possible to reduce the effective diameter of each of the reflecting surface disposed on the right side on which the light beam from the image forming element disposed on the right side is reflected, and the reflecting surface disposed on the right side for reflecting the light beam from the image forming element disposed on the left side. As a result, the degree of freedom of the arrangement of at least two reflecting surfaces disposed on the right side with respect to the symmetry plane C is increased, to thereby realize the image display apparatus whose size is reduced and whose view angle is widened.

Numerical Embodiment

A numerical embodiment of the optical system according to the present invention is given below.

Figure 6:
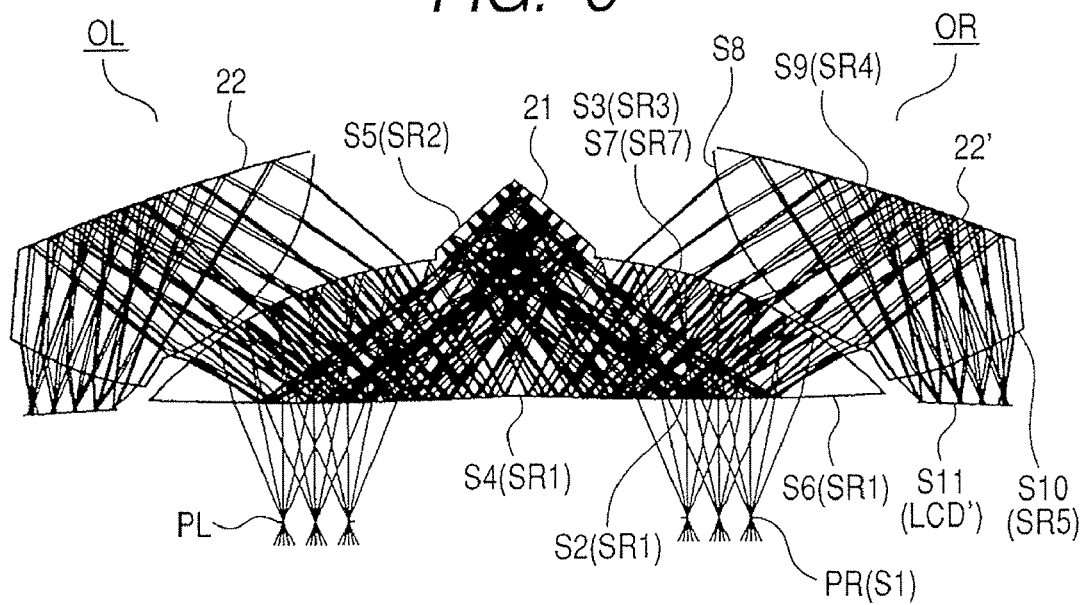
FIG. 6 is a schematic diagram illustrating a main part according to a numerical embodiment of the present invention.
Figure 7:
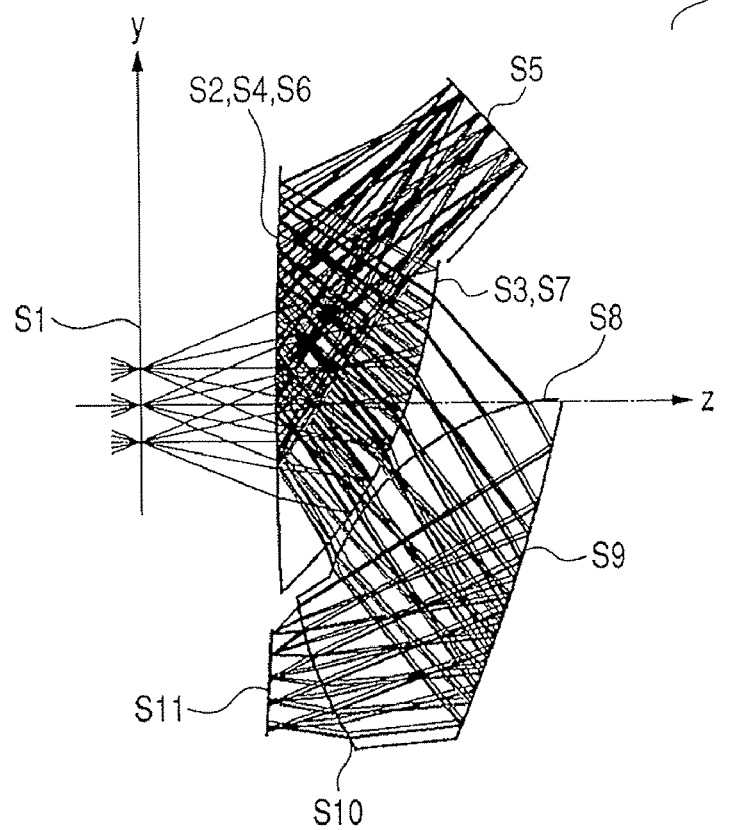
FIG. 7 is an explanatory diagram of the numerical embodiment of the present invention.
Figure 8A:
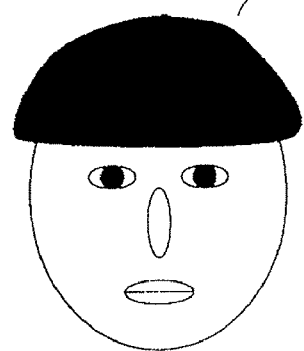
FIGS. 8A, 8B and 8C are diagrams for illustrating impressions obtained when an observer wearing an HMD is viewed from the front.
Figure 8B:
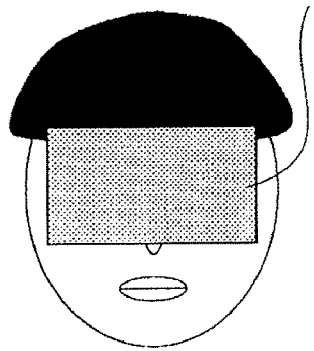
Figure 8C:
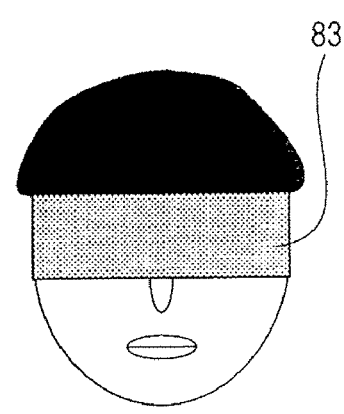

FIG. 6 is a schematic diagram illustrating a main part of the optical system used in the image display apparatus according to the numerical embodiment of the present invention. FIG. 7 is an explanatory diagram illustrating each surface in a case where only the right eye optical system OR is extracted. In FIG. 6, components identical with those illustrated in FIGS. 1-5 are denoted by the same reference symbols. FIG. 6 illustrates a correspondence between surfaces S1 to S11 (SURF) used in the numerical embodiment to be described later and surfaces (SR1 to SR5) used in FIG. 1. Details are described blow.

S1: PR S2: SR1
S3: SR3 S4: SR1
S5: SR2 S6: SR1
S7: SR3 S8: surface of prism 22' opposing surface SR3
S9: SR4 S10: SR5
S11: LCD'

In the numerical embodiment, a description is made as to a case where the light beam is reversely traced from the side of positions of the pupils (PL and PR) of the observer.

In the description of data of the optical system, the pupil positions (PL, PR) of the observer are represented as a reference of a global coordinate system.

As illustrated in FIG. 7, a three dimensional coordinate axis in the global coordinate system is represented by the Z axis, the Y axis, and the x axis in the same manner as in the description with reference to FIG. 2. Note that with respect to the coordinate system of FIG. 2, the position of the origin is appropriately moved so as to be positioned at the center PR of the exit pupil to match the Z axis in the visual axis direction (direction from the center position SCR toward the center of the virtual image formed by the optical system) of the observer.

Z axis: A straight line passing through the center (absolute coordinate origin) of the first surface, in which the visual axis direction (direction from the center positions SCL and SCR of the exit pupils to the center of the virtual image formed by the optical system) of the observer is set as a positive direction.

Y axis: A straight line passing through the center (absolute coordinate origin) of the first surface and perpendicular to the Z axis, in which the direction rotated by 90 degrees in the clockwise direction is set as a positive direction.

X axis: A straight line passing through the origin and perpendicular to the Z axis and the Y axis in which the depth direction of the paper surface is set as a positive direction.

Thus, the coordinate axes are defined.

With regard to each optical surface forming the optical system, the position of the origin of the coordinate system (local coordinate system) for representing each shape of the optical surfaces in the global coordinate system is represented by Y and Z. It is assumed that an inclination within the local coordinate system with respect to the global coordinate system is represented by A (angle (unit; degree) based on that the direction in which the Z axis of the local coordinate system is inclined in the counterclockwise direction with respect to the Z axis of the global coordinate system is set as a positive direction). All the inclination of an x coordinate value X is zero, so a description thereof is omitted. Also, the inclination within an XZ plane of the local coordinate system with respect to the global coordinate system and the inclination within a XY plane of the local coordinate system with respect to the global coordinate system are also zero, so descriptions thereof are also omitted. The coordinate system represented by the x, y, and z axes defined as described above is assumed to be a local coordinate system of each surface.

Further, Nd and vd denote refractive index and Abbe number of a medium located in the farther side of the surface for d-line, respectively. Changing of the refractive index indicates reflection on the surface.

Hereinafter, a rotational asymmetrical surface shape, which does not include a rotational symmetric axis, used in the embodiments is represented by the following expression.

In the first numerical embodiment, the rotational asymmetrical surface is represented by the following expression of a rotational asymmetrical surface shape, and is represented as FFS in Table 1. In the numerical embodiment, each of the surfaces has a shape symmetrical with respect to the YZ plane, so in the expression, an odd-order term of X is eliminated in advance.

$$z = \frac{(x^2+y^2)/r}{1+SQRT(1-(1+c1)(x^2+y^2)/r^2)} +$$
$$c5(x^2-y^2)+c6(2x^2+2y^2-1)+$$
$$c10(3x^2y+3y^3-2y)+c11(3x^2y-y^3)+$$
$$c12(x^4-6x^2y^2+y^4)+$$
$$c13(4x^4-4y^4-3x^2+3y^2)+$$
$$c14(6x^4+12x^2y^2+6y^4-6x^2-6y^2+1)+$$
$$c20(10yx^4+20x^2y^3+10y^5-12x^2y-$$
$$12y^3+3y)+c21(15yx^4+10x^2y^3-5y^5-$$
$$12x^2y+4y^3)+c22(5yx^4-10x^2y^3+y^5)+$$
$$c23(x^6-15x^4y^2+15x^2y^4-y^6)+$$
$$c24(6x^6-30x^4y^2-30x^2y^4+6y^6-5x^4+$$
$$30x^2y^2-5y^4)+c25(15x^6+15x^4y^2-15x^2y^4-$$
$$15y^6-20x^4+20y^4+6x^2-6y^2)+c26(20x^6+$$
$$60x^4y^2+60x^2y^4+20y^6-30x^4-60x^2y^2-$$
$$30y^4+12x^2+12y^2-1)$$

(Expression 1)

Surfaces represented by FFS are denoted by numerals (1), (2), . . . , and an aspherical coefficient C** of each surface is represented in a lower column of Table 1.

In addition, in the numerical embodiment, a spherical surface is denoted by SPH, and only a value of a curvature radius R is represented.

In this case, at a hit point of an arbitrary light beam on each surface, a surface including an incident light beam and an emitted light beam of each reference light beam is defined as a local meridional section, and a surface which includes the hit point, is perpendicular to the local meridional section, and is parallel to a sagittal section (normal sagittal section) of the coordinate system of each surface vertex, is defined as a local sagittal section.

A focal length of the local meridional section, local_fy, is defined by the expression local_fy=local_ry/(nd'-nd) and a focal length of the local sagittal section, local_fx, is defined by the expression local_fx=rx/(nd'-nd), where local_ry represents a curvature of the local meridional section, local_rx represents a curvature of the local sagittal section, and nd and nd' represent refractive indexes before and after the surface are, respectively. Further, a meridional section power, local_φy, and a local sagittal section power, local_φx, are defined by the expressions local_φy=1/local_fy and local_φx=1/local_fx, respectively.

Herein, letting an i-th local meridional section power be represented by local_φyi, a converted surface interval, local_d, is defined as a value obtained by dividing a distance between a hit point of the center view angle principal ray L0 on the i-th optical surface and a hit point of the center view angle principal ray L0 on the i+1-th optical surface, by the refractive index of the medium provided therebetween. In this case, a meridional section combined power, local_φy(m-n), is defined as the combined power obtained by the normal paraxial tracing calculation from m-th surface to an n-th surface, and local_fy(m-n) which is inverse of local_φy(m-n) is defined as a combined focal length of the meridional section from the m-th surface to the n-th surface.

Similarly, letting an i-th local sagittal section power be represented by local_φxi, and local_d be the converted surface interval, a sagittal section combined power, local_φx(m-n), is defined as the combined power obtained by the normal paraxial tracing calculation for the converted interval, local_d, between the hit points and local_fx(m-n) which is an inverse of local_φx(m-n) is defined as a combined focal length of the sagittal section from the m-th surface to the n-th surface First Numerical Embodiment Table 1 illustrates data of the first numerical embodiment. A horizontal view angle of the observer is ±22.5 degrees (within paper surface), and a vertical view angle of the observer is ±17.3 degrees (perpendicular to paper surface). The diameter of the exit pupil is 10 mm. Table 2 illustrates each local curvature radius (local_rx, local_ry) of the center view angle principal ray on each surface and each local focal length (local_fx, local_fy) according to the first numerical embodiment. Further, Table 2 illustrates each combined focal length (local_fx(2-10), local_fy(2-10) of all the optical systems. Table 3 illustrates each local curvature radius (local_rx, local_ry) of a light beam closest to the symmetry plane C among the effective light beams on each surface, and each local focal length (local_fx, local_fy). Further, Table 3 illustrates each combined focal length (local_fx(2-10), local_fy (2-10)) for the entire optical system.

TABLE 1

| SURF | Y | Z | A | R | typ | Nd | vd |
|---|---|---|---|---|---|---|---|
| 1 | 0.000 | 0.000 | 0.000 | ∞ | SPH | 1.0000 | 0.0 |
| 2 | 0.000 | 18.832 | 0.000 | 384.6652 | FFS(1) | 1.5709 | 33.8 |
| 3 | −8.000 | 33.416 | −28.000 | −65.4521 | FFS(2) | −1.5709 | 33.8 |
| 4 | 0.000 | 18.832 | 0.000 | 384.6652 | FFS(1) | 1.5709 | 33.8 |
| 5 | 19.602 | 62.343 | 31.668 | −157.6420 | FFS(3) | −1.5709 | 33.8 |
| 6 | 0.000 | 18.832 | 0.000 | 384.6652 | FFS(1) | 1.5709 | 33.8 |
| 7 | −8.000 | 33.416 | −28.000 | −65.4521 | FFS(2) | 1.0000 | 0.0 |
| 8 | −7.572 | 37.503 | −51.284 | 36.4185 | FFS(4) | 1.5709 | 33.8 |
| 9 | −21.163 | 52.815 | −17.835 | −261.7754 | FFS(5) | −1.5709 | 33.8 |
| 10 | −32.989 | 22.777 | 15.229 | 45.1542 | FFS(6) | −1.0000 | 0.0 |
| 11 | −34.336 | 17.829 | −2.895 | ∞ | SPH | 1.0000 | 0.0 |

| | c1 | c5 | c6 |
|---|---|---|---|
| FFS(1) | −5.3212E+01 | 2.2856E−04 | −8.4576E−05 |
| FFS(2) | −3.8847E+00 | −7.2052E−04 | −6.7165E−04 |
| FFS(3) | −1.6054E+01 | 5.2122E−04 | −2.4349E−04 |
| FFS(4) | 3.5082E−03 | 6.5379E−04 | 3.2453E−04 |
| FFS(5) | −2.2014E+01 | −7.2704E−05 | −2.0040E−05 |
| FFS(6) | −1.3928E+01 | 1.2391E−04 | 6.1393E−04 |

TABLE 2

(Local paraxial ray <FOV: Wy = 0.00 deg Wx = 0.00 deg Py = 0.00>)

| SURF | local_ry | local_rx | local_fy | local_fx | local_d | Nd |
|---|---|---|---|---|---|---|
| FFS2 | 554.24937 | 367.85272 | 970.834 | 644.338 | 18.133 | 1.571 |
| FFS-M3 | −66.79769 | −52.55302 | 21.261 | 16.727 | −23.397 | −1.571 |
| FFS-M4 | 657.71033 | 381.57080 | 209.342 | 121.450 | 37.449 | 1.571 |
| FFS-M5 | −165.97524 | −182.13109 | 52.828 | 57.970 | −42.903 | −1.571 |
| FPS-M6 | 575.15617 | 370.84182 | 183.066 | 118.035 | 20.996 | 1.571 |
| FFS7 | −60.53401 | −51.53316 | 106.033 | 90.267 | 2.304 | 1.000 |
| FFS8 | 36.42786 | 33.06399 | 63.808 | 57.916 | 25.360 | 1.571 |
| FFS-M9 | −279.67583 | −250.78436 | 89.018 | 79.822 | −26.254 | −1.571 |
| FES10 | 47.41732 | 42.00803 | 83.057 | 73.582 | −6.445 | −1.000 |

| SURF | Hit point (y, x) |
|---|---|
| 2 | (0.000, 0.000) |
| 3 | (8.730, 0.000) |
| 4 | (15.024, 0.000) |
| 5 | (22.333, 0.000) |
| 6 | (6.956, 0.000) |
| 7 | (−0.438, 0.000) |
| 8 | (−4.144, 0.000) |
| 9 | (−10.079, 0.000) |
| 10 | (−4.001, 0.000) |

| local_fy(2-10) | local_fx(2-10) |
|---|---|
| −17.555 | −12.083 |

TABLE 3

(Local paraxial ray <FOV: Wy = 22.50 deg Wx = 0.00 deg Py = 5.00>)

| SURF | local_ry | local_rx | local_fy | local_fx | local_d | nd |
|---|---|---|---|---|---|---|
| FFS2 | 628.53433 | 377.96036 | 1100.953 | 662.043 | 22.905 | 1.571 |
| FFS-M3 | −125.15989 | −60.01062 | 39.837 | 19.101 | −24.770 | −1.571 |
| FFS-M4 | 1098.28677 | 420.33041 | 349.572 | 133.786 | 28.087 | 1.571 |
| FFS-M5 | −189.80666 | −193.37254 | 60.413 | 61.548 | −56.465 | −1.571 |
| FFS-M6 | 584.23546 | 372.10305 | 185.956 | 118.436 | 13.132 | 1.571 |
| FFS7 | −77.31785 | −54.13863 | 135.432 | 94.830 | 3.260 | 1.000 |
| FFS8 | 36.37011 | 29.09098 | 63.707 | 50.956 | 28.218 | 1.571 |
| FFS-M9 | −353.86874 | −268.84897 | 112.632 | 85.572 | −15.524 | −1.571 |
| FFS10 | 128.40199 | 57.98127 | 224.912 | 101.561 | −11.386 | −1.000 |

| SURF | Hit point (y, x) |
|---|---|
| 2 | (12.861, 0.000) |
| 3 | (26.847, 0.000) |
| 4 | (30.249, 0.000) |
| 5 | (27.724, 0.000) |
| 6 | (−8.303, 0.000) |
| 7 | (−14.138, 0.000) |
| 8 | (−18.285, 0.000) |
| 9 | (−25.240, 0.000) |
| 10 | (−14.422, 0.000) |

| local_fy(2-10) | local_fx(2-10) |
|---|---|
| −55.860 | −12.859 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-054722, filed Mar. 1, 2006, which is hereby incorporated by reference herein in its entirety.

What is claimed is:

1. An image display apparatus, comprising:

a pair of image forming elements; and an optical system for guiding a light beam from the pair of image forming elements to a pair of observation areas, wherein:

the optical system includes a plurality of curved reflecting surfaces, and is symmetrical with respect to a symmetry plane which is a plane passing through a center of the pair of observation areas, in which a light beam from the image forming elements disposed on one side of the symmetry plane is reflected on a curved reflecting surface disposed on the one side and reflected on a curved reflecting surface disposed on the other side of the symmetry plane to return to the one side, is reflected on the curved reflecting surface disposed on the one side of the symmetry plane, and passes through a surface (SLa) to be guided to the observation area on the one side; and an area in the area of the surface (SLa) through which a light beam (LLa), which travels along an optical path closest to the symmetry plane, passes, among effective light beams which pass through the surface (SLa) and reach the observation areas, is formed in a shape having a positive refractive power.

2. An image display apparatus according to claim 1, wherein:

the optical system includes a prism filled with a medium having a refractive index larger than 1 in the plurality of curved reflecting surfaces; and the surface (SLa) is a surface through which the light beam (LLa) having exited the prism and is made incident on the observation areas.

3. An image display apparatus according to claim 2, wherein:

the prism includes a reflection-cum-transmission surface for carrying out a reflecting action and a transmitting action; and the reflection-cum-transmission surface, which forms a part of the surface (SLa), has a shape in which the light beam (LLa) is subjected to a positive reflecting action.

4. An image display apparatus according to claim 1, wherein:

the optical system includes an optical element having a positive refractive power on a light incident side of the observation area; and the surface (SLa) is one of one surface and both surfaces of the optical element.

5. An image display system, comprising:

the image display apparatus according to claim 1; and an image information supply apparatus for supplying the image display apparatus with image information.

6. An image display apparatus, comprising:

a pair of image forming elements; and an optical system for guiding a light beam from the pair of image forming elements to a pair of observation areas, wherein:

the optical system includes a plurality of curved reflecting surfaces, and is symmetrical with respect to a symmetry plane which is a plane passing through a center of the pair of observation areas, in which a light beam from the image forming elements disposed on one side of the symmetry plane is reflected on a curved reflecting surface disposed on the one side and reflected on a curved reflecting surface disposed on the other side of the symmetry plane to return to the one side, is reflected on the curved reflecting surface disposed on the one side of the symmetry plane to be guided to the observation area on the one side; and a light beam, among effective light beams reaching the observation areas, which travels along an optical path closest to the symmetry plane after passing through the optical system is subjected to a positive transmission refractive power.

7. An image display apparatus according to claim 6, wherein the optical system includes a prism filled with a medium having a refractive index larger than 1 in the plurality of curved reflecting surfaces, and an exit surface of the prism is a surface in which the light beam traveling along the optical path closest to the symmetry plane is subjected to the positive transmission refractive power.

8. An image display apparatus according to claim 7, wherein the exit surface of the prism is a reflection-cum-transmission surface in which the light beam traveling along the optical path closest to the symmetry plane is subjected to a positive reflecting action.

9. An image display apparatus according to claim 6, wherein the optical system includes an optical element having a positive refractive power on a light incident side of the observation area.

10. An image display system, comprising:

the image display apparatus according to claim 6; and an image information supply apparatus for supplying the image display apparatus with image information.

* * * * *